W. SIEBENMORGEN & S. H. KEEFER.
SYSTEM OF MOTOR CONTROL.
APPLICATION FILED FEB. 8, 1910.

986,091.

Patented Mar. 7, 1911.

Witnesses:

Inventors:
Samuel H. Keefer,
William Siebenmorgen,
by their Attorneys
Howson & Howson

UNITED STATES PATENT OFFICE.

WILLIAM SIEBENMORGEN AND SAMUEL H. KEEFER, OF PLAINFIELD, NEW JERSEY, ASSIGNORS TO NILES-BEMENT-POND COMPANY, OF JERSEY CITY, NEW JERSEY, A CORPORATION OF NEW JERSEY.

SYSTEM OF MOTOR CONTROL.

986,091.

Specification of Letters Patent.

Patented Mar. 7, 1911.

Application filed February 8, 1910. Serial No. 542,798.

*To all whom it may concern:*

Be it known that we, WILLIAM SIEBENMORGEN and SAMUEL H. KEEFER, both citizens of the United States, residing in Plainfield, State of New Jersey, have invented certain Improvements in Systems of Motor Control, of which the following is a specification.

In starting an electric motor by varying the resistance in circuit with its field or armature, it is customary to cut one or more bodies of such resistance into or out of circuit, as the case may be, in a series of steps, thus gradually bringing the motor up to speed in a time which, among other things, depends upon the rapidity with which such bodies of resistance are introduced into or removed from the circuit. In starting or varying the speed of motors such as are employed in operating planers, slotters, printing presses, and the like, it is desirable that the machine be accelerated as rapidly as possible to its maximum speed; and one object of the present invention is to provide a novel combination of apparatus for accomplishing this end.

We further desire to provide a combination of apparatus which shall automatically act to temporarily cut out or insert a body of resistance, or other electric current-varying means, during the period within which the speed of the motor is being accelerated, and which shall thereafter insert or cut out such means, either at some other time during the acceleration of the motor, or after it has been brought up to speed.

These objects and other advantageous ends we secure as hereinafter set forth, reference being had to the accompanying drawings, in which:—

Figure 1:
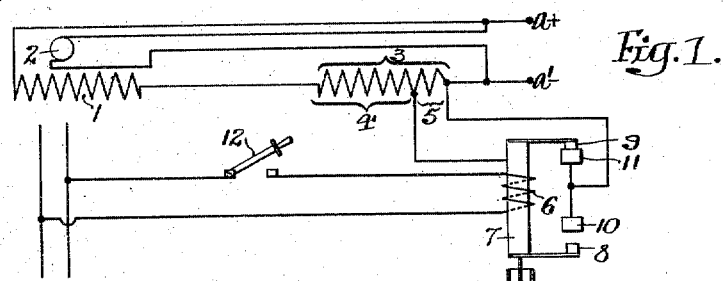
Figure 2:
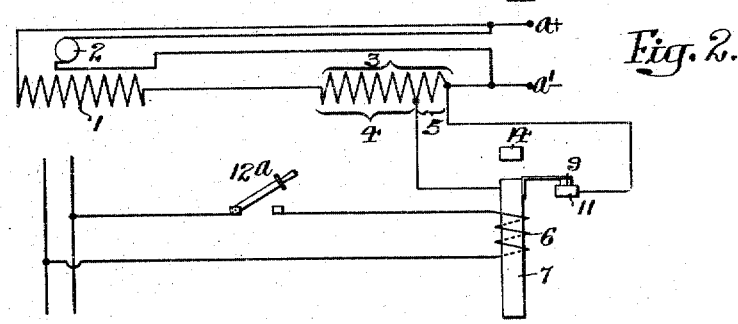
Figure 3:
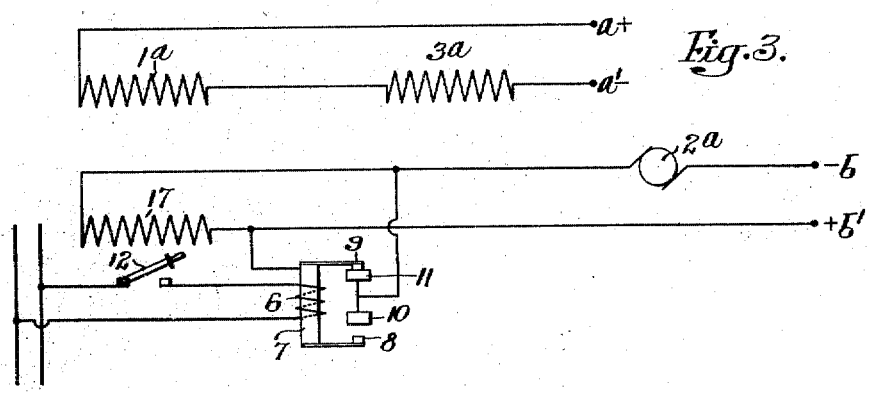
Figure 4:
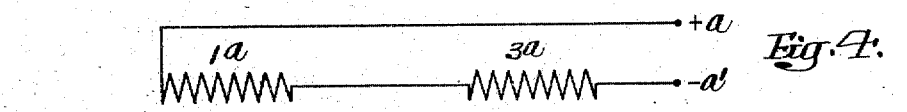
Figure 4:
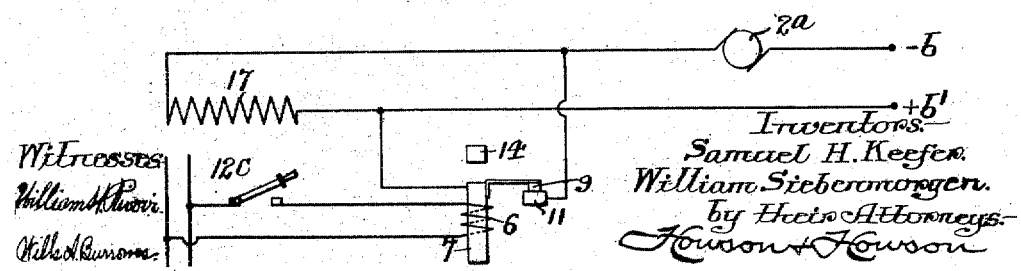

Figure 1, is a diagrammatic representation of a system embodying our invention; Fig. 2, is a diagrammatic view similar to Fig. 1, illustrating a slightly modified form of the automatic controlling apparatus; Fig. 3, is a diagrammatic representation illustrating our invention as applied to a compound wound motor; and Fig. 4, is a similar diagrammatic view showing a slight modification of the system illustrated in Fig. 3.

Referring to Fig. 1, 2 is the armature of a shunt motor and 1 is the field winding thereof; there being in series with this latter a body 3 of variable resistance. It will be understood that the amount of this resistance in circuit with the shunt field may be varied by any of the various methods known in the art, although in addition to that particular portion of said resistance indicated at 4, primarily designed for causing the well known variations in the field current whereby the speed of the motor is varied, we provide an additional section of resistance 5 for the purposes of our invention. In shunt with this resistance 5, we connect some electrical device, whereby it is, in this instance, short-circuited, but which is capable, when properly actuated, of temporarily opening the short circuit and thereafter again closing it as before. For this purpose, we may employ a solenoid having a winding 6 and a core 7, which core is electrically connected to one end of the body 5 of resistance and is also connected to two contacts 8 and 9 capable of respectively coöperating with fixed contacts 10 and 11. These latter contacts are connected to each other and to the second end of the body 5 of resistance. The winding 6 of the solenoid may be connected to any suitable source of current and also to any desired automatic or hand operated switch, whereby the flow of current through it may be controlled in the manner desired. In the present instance, we have shown a switch 12 so connected.

When it is desired to start the motor, the terminals *a* and *a'* of the motor circuit are connected to a suitable source of current, so that current flows from one of said terminals through the armature 2 to the other terminal and also flows through the field winding 1, the resistance 4, solenoid core 7, and contacts 9 and 11, with the result that the motor will at once tend to assume a certain speed depending, among other things, upon the amount of said resistance 4. According to our invention, however, at the same time that current is supplied to the terminals *a* and *a'*, the switch 12 is also closed either automatically or by hand, so that the solenoid winding 6 is energized and the core 7 is actuated, first to separate the contacts 9 and 11, and then to bring the contacts 8 and 10 into engagement with each other. As a result, during the first moments current is supplied to the motor, the whole body 3 of resistance is in series with the field winding 1, so that the field strength of the motor is a minimum and the tendency to accelerate its speed is a maximum. It will be seen, however, that the body 5 of resistance is only temporarily inserted in the circuit, for as soon as the core 7 of the solenoid has moved sufficiently to bring the contacts 8 and 10 into engagement, said body is again short-circuited, so that an increased volume of current is permitted to flow in the field circuit; this current being the amount necessary to secure the desired speed of operation of the motor.

Any desired means, such as a dash pot 13, may be employed to retard the upward movement of the core of the solenoid, and in Fig. 2, we have shown another form of apparatus whereby this same end may be secured. For this purpose, the solenoid core 7 is, as before, connected to one end of the extra body of resistance 5, while the opposite end of said resistance is connected to but a single contact 11. The solenoid core carries a single contact 9 designed to engage the fixed contact 11 and there is mounted adjacent to said core a body 14 of iron or other suitable magnetic material with which the core may directly engage. In this case, the winding 6 of the solenoid is in circuit with some form of switch 12ª which may conveniently be closed and then opened after a predetermined time, either by hand or automatically, so that under operating conditions, the core 7 of the solenoid is drawn upwardly into contact with the body 14 of magnetic material which is preferably included in the magnetic circuit of the solenoid. At the same time the contacts 9 and 11 are separated so as to break the short-circuit around the extra body 5 of resistance. Even though the flow of current through the winding 6 may be of relatively short duration, the core 7 does not immediately return to its normal or lower position, since owing to its residual magnetism, as well as to that of the body 14 and of the iron casing with which the solenoid is customarily equipped, it tends to remain for a definite time in engagement with said body 14. When, however, the residual magnetism has practically died out, the core is released and falls under the action of gravity or of a spring, so that the contact 9 is again brought in engagement with the contact 11. The result attained is the same as that described in connection with the apparatus shown in Fig. 1, for the field of the motor is temporarily weakened during its period of acceleration and is afterward returned to the desired normal strength after the motor has been brought up to speed. By this means the period of time required for acceleration is very materially reduced, which is, as will be understood by those skilled in the art, a most important item in the operation of machine tools and similar apparatus.

While many combinations of apparatus may be devised for accomplishing the above noted result without departing from our invention, we have illustrated two in addition to those suggested in Figs. 1 and 2. The first of these is shown in Fig. 3, where we have illustrated our invention as applied to a compound wound motor having an armature $2^a$, a shunt field $1^a$ and a body of field resistance $3^a$. The series field winding 17 has its turns so disposed that the flux produced by it opposes that of the shunt field winding, and as in the case of the auxiliary or extra body of resistance 5, there is connected in shunt to this series field winding an automatic switch provided by the two pairs of contacts 9 and 11 and 8 and 10 respectively, which are controlled by a solenoid having a winding 6 and a core 7 as above described. In this instance the switch 12 in circuit with the solenoid winding is closed at the same time current is supplied to the terminals $a$, $a'$, $b$, $b'$ of the motor circuit, so that during the period of acceleration of the motor, the series winding is energized by the current flowing through the armature circuit and its flux opposes that due to the shunt winding, thus weakening the field with the result above noted. At the end of this period the contact 8 engages the contact 10 and the series winding is again short-circuited, in which condition it remains. As in the case of Fig. 2, we may omit the second pair of contacts 8 and 10 and provide the solenoid 6—7 with a body of magnetic material 14 adjacent to its core, which in this instance is provided with but a single contact 9 co-acting with the fixed contact 11. In this case, when the switch $12^c$ is closed simultaneously with that governing the supply of current to the motor circuit, the short circuit around the series field winding 17 is broken by reason of the separation of the contacts 9 and 11 under the action of the solenoid winding 6. During the period of acceleration, the residual magnetism of the core 7 and of the magnetic body 14, maintains said core in its elevated position against the action of gravity, even though the switch $12^c$ be opened after it has been originally closed. By the time this residual magnetism has fallen sufficiently to permit the core 7 to drop and again connect the contacts 9 and 11, the motor has reached its full speed, and when the series field is thus cut out, the field flux is permitted to remain at the proper strength necessary to insure the designed operation and speed of the motor.

By reason of the fact that the series field winding is opposed to the shunt field winding $1^a$, it so weakens the field flux that the period of acceleration of the motor is made materially shorter than would otherwise be the case. The effect of this temporary variation in the field strength of the motor, as will be understood by those skilled in the art, is to permit an abnormal current to flow in its armature circuit during the period of acceleration; which current, however, is automatically reduced, when the motor has come up to speed, by the apparatus heretofore described, so that it thereafter operates with the current and speed for which it was designed. It will further be noted that without departing from our invention, other means may be employed for temporarily increasing the armature current of the motor during its period of acceleration and then cutting down the current flow to the proper point after the machine has come up to speed by means independent of the motor armature.

We claim:—

1. The combination of a motor having a field winding; means for automatically weakening the field flux of the motor as soon as current is supplied in order to start the same; with means for causing said field to be restored to its normal strength after the motor has come up to speed.

2. The combination with a motor having a field winding of a body of resistance connected in series therewith; a device for normally cutting out said resistance; and means whereby said resistance is temporarily placed in circuit with the field winding during the period of acceleration of the motor.

3. The combination of a motor having a shunt field winding; a body of resistance in series with said winding; a switch normally short-circuiting said resistance; and electromagnetic means whereby said switch is opened at the beginning of the period of acceleration of the motor and closed at the end of said period.

In testimony whereof, we have signed our names to this specification in the presence of two subscribing witnesses.

WM. SIEBENMORGEN.
SAML. H. KEEFER.

Witnesses:
 EARLE S. SMITH,
 LESLIE M. CRANE.

---

Copies of this patent may be obtained for five cents each, by addressing the "Commissioner of Patents, Washington, D. C."